(12) United States Patent
Boemler

(10) Patent No.: US 9,854,192 B2
(45) Date of Patent: Dec. 26, 2017

(54) DIGITAL UNIT CELL WITH ANALOG COUNTER ELEMENT

(71) Applicant: RAYTHEON COMPANY, Waltham, MA (US)

(72) Inventor: Christian M. Boemler, Goleta, CA (US)

(73) Assignee: RAYTHEON COMPANY, Waltham, MA (US)

( * ) Notice: Subject to any disclaimer, the term of this patent is extended or adjusted under 35 U.S.C. 154(b) by 98 days.

(21) Appl. No.: 15/096,572

(22) Filed: Apr. 12, 2016

(65) Prior Publication Data

US 2017/0295333 A1    Oct. 12, 2017

(51) Int. Cl.
*H04N 5/369* (2011.01)
*H04N 5/378* (2011.01)

(52) U.S. Cl.
CPC ........... *H04N 5/3698* (2013.01); *H04N 5/378* (2013.01)

(58) Field of Classification Search
CPC .............................. H04N 5/3698; H04N 5/378
See application file for complete search history.

(56) References Cited

U.S. PATENT DOCUMENTS 7,202,463 B1    4/2007  Cox
2006/0027730 A1  2/2006  Bamji et al.

OTHER PUBLICATIONS

International Search Report and Written Opinion for application No. PCT/US2017/016815 dated Feb. 7, 2017.

*Primary Examiner* — Twyler Haskins
*Assistant Examiner* — Fayez Bhuiyan
(74) *Attorney, Agent, or Firm* — Lando & Anastasi, LLP

(57) ABSTRACT

According to one aspect, embodiments herein provide a digital unit cell comprising a photodiode, an integration capacitor, a comparator configured to compare a voltage across the integration capacitor with a threshold voltage and to generate a control signal at a first level each time the voltage across the integration capacitor is greater than the threshold voltage, a charge subtraction circuit configured to receive the control signal at the first level and to discharge accumulated charge on the integration capacitor each time the control signal at the first level is received, at least one analog counter configured to receive the control signal at the first level from the comparator and to decrease a count voltage by a fixed amount each time the control signal at the first level is received from the comparator, and a counter readout circuit configured to provide the count voltage to an image processing circuit.

20 Claims, 3 Drawing Sheets

DIGITAL UNIT CELL WITH ANALOG COUNTER ELEMENT

BACKGROUND

There are many different types of image capturing devices such as digital cameras, video cameras, or other photographic and/or image capturing equipment. These image capturing devices may use image sensors to capture images from a desired scene. For example, an image sensor may include an array of unit cells (i.e., a focal plane array) that receives light via a lens. The received light causes each unit cell in the array to accumulate an electric charge proportional to the light intensity at its location.

A focal plane array typically includes a two-dimensional array of unit cells organized by columns and rows. It is common for a circuit or imager within a unit cell to accumulate charge from a photo-diode, the charge corresponding to the flux of light of various wavelengths incident on the photo-diode. Often, the charge is accumulated on a capacitive element which effectively integrates charge, producing a voltage that corresponds to the intensity of the flux over a given time interval called an integration interval or integration period.

Each unit cell in a focal plane array generally corresponds to a picture element, or pixel, in the final image of the desired scene. A pixel is considered the smallest portion of a digital image. A digital image is generally made up of an array of pixels. Circuitry coupled to the image capturing device may perform post light capture processing steps to convert the accumulated charges from each unit cell into pixel information. This information may include the color, saturation, brightness, or other information that a digital image storage format may require. Digital images may be stored in formats such as .JPG, .GIF, .TIFF, or any other suitable format.

In a traditional analog unit cell, a well capacitor is coupled to a detector diode. The well capacitor integrates photo-current from the detector diode over an integration interval (e.g., 10 μs). Once per frame, the voltage on the well capacitor is transferred to a sample-and-hold capacitor and then transferred out, line by line, to an Analog to Digital Converter (ADC) which converts the voltage to a binary value. However, as unit cell sizes have decreased, the ability of the well capacitor to store an effective amount of charge has diminished.

Traditional "digital" unit cells provide for the Analog to Digital Conversion (ADC) of accumulated charge. In-unit cell Analog to Digital Conversion (ADC) imaging offers improved photo-charge capacity even as the desired size of unit cells continues to shrink (e.g., below 15 microns). For example, a traditional digital unit cell design includes a quantizing analog front end circuit which accumulates charge over a relatively small capacitor and is reset (i.e., discharged) each time a threshold charge is stored on the capacitor. The pattern of charging and resetting is repeated as more photo-current integrates. Each reset event is "accumulated" (i.e., counted) with a digital counter circuit. Each frame, a global snapshot is taken by copying the digital counter contents to a snapshot register and then reading the snapshot registers out, line by line. The effect is to exponentially increase well capacity of the imager while maintaining a relatively small unit cell size.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

SUMMARY

Figure 1:
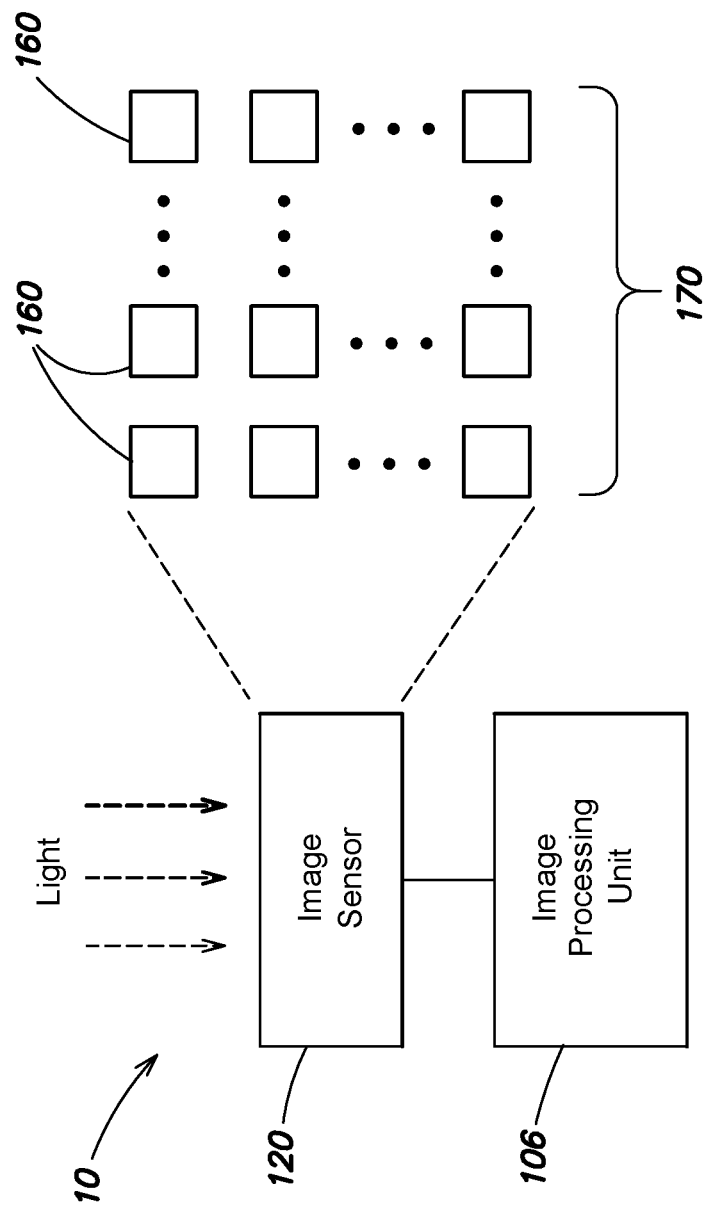
FIG. 1 is a block diagram illustrating an image capture device according to aspects of the invention.

A digital unit cell is provided that includes a new analog counter element that is capable of counting electric charge reset events (i.e., discharge events) of a corresponding integration capacitor. The analog counter element is set with an initial counter voltage and the counter voltage is decreased each time the integration capacitor of the digital unit cell is reset. The total charge accumulated in the digital unit cell can be calculated based on the number of times the count voltage of the analog counter is decreased and any residual voltage stored on the integration capacitor. The analog counter is physically smaller, operates with less power, and injects less cross-talk, compared to traditional digital counter elements. The analog counter is also capable of maintaining a maximum counter value that is equivalent to traditional digital counters, despite its smaller size.

Aspects and embodiments are directed to a digital unit cell comprising a photodiode, an integration capacitor coupled to the photodiode and configured to accumulate charge generated by the photodiode responsive to an input light signal incident on the photodiode over an integration period, a comparator coupled to the integration capacitor and configured to compare a voltage across the integration capacitor with a threshold voltage and to generate a control signal at a first level each time a determination is made that the voltage across the integration capacitor is greater than the threshold voltage, a charge subtraction circuit coupled to the integration capacitor and to the comparator and configured to receive the control signal at the first level from the comparator and to discharge the accumulated charge on the integration capacitor each time the control signal at the first level is received from the comparator, at least one analog counter coupled to the comparator and configured to receive the control signal at the first level from the comparator and to decrease a count voltage by a fixed amount each time the control signal at the first level is received from the comparator, and a counter readout circuit coupled to the at least one analog counter and configured to provide the count voltage to an image processing circuit at an end of the integration period.

According to one embodiment, the at least one analog counter comprises a count capacitor coupled to the counter readout circuit and configured to maintain the count voltage. In another embodiment, the at least one analog counter further comprises a transistor circuit coupled to the count capacitor and configured to remove a fixed portion of charge from the count capacitor each time the at least one analog counter receives the control signal at the first level from the comparator. In one embodiment, the at least analog counter further comprises a reset circuit coupled to the count capacitor and configured to set the count voltage to an initial value at a beginning of the integration period.

According to another embodiment, the digital unit cell further comprises a sample and hold capacitor coupled to the integration capacitor and configured to receive a residual voltage from the integration capacitor at the end of the integration period. In one embodiment, the digital unit cell further comprises a residual readout circuit coupled to the sample and hold capacitor and configured to output the residual voltage from the sample and hold capacitor at the end of the integration period. In another embodiment, the digital unit cell further comprises an image processing circuit coupled to the counter readout circuit and the residual readout circuit and configured to receive the count voltage from the counter readout circuit, receive the residual voltage from the residual readout circuit, and calculate a total charge accumulated by the digital unit cell based on the count voltage and the residual voltage. In one embodiment, the image processing circuit is further configured to calculate the total charge accumulated by the digital unit cell by calculating, based at least on the count voltage, a total number of times that the charge subtraction circuit discharged the accumulated charge on the integration capacitor, and calculating the total charge accumulated by the digital unit cell by multiplying the total number of times that the charge subtraction circuit discharged the accumulated charge on the integration capacitor by the fixed portion of charge and adding the residual voltage.

According to one embodiment, the charge subtraction circuit comprises a transistor circuit configured to remove the accumulated charge on the integration capacitor each time the charge subtraction circuit receives the control signal at the first level from the comparator. In one embodiment, the at least one analog counter includes a first analog counter selectively coupled to the counter readout circuit via a first counter selection switch and a second analog counter selectively coupled to the counter readout circuit via a second counter selection switch.

At least one aspect is directed to a method for operating a digital unit cell comprising a photodiode and an integration capacitor, the method comprising generating charge in response to an input light signal incident on the photodiode over an integration period, accumulating the charge on the integration capacitor, comparing a voltage across the integration capacitor with a threshold voltage, removing the accumulated charge on the integration capacitor each time the voltage across the integration capacitor exceeds the threshold voltage, decreasing, by a fixed amount, a count voltage of an analog counter each time the voltage across the integration capacitor exceeds the threshold voltage, and reading out, at an end of the integration period, the count voltage of the analog counter to an image processor.

According to one embodiment, removing the accumulated charge on the integration capacitor includes coupling the integration capacitor to ground. In another embodiment, decreasing, by the fixed amount, the count voltage of the analog counter includes removing a fixed portion of charge from a count capacitor in the analog counter. In one embodiment, the method further comprises setting, at a beginning of the integration period, the count voltage of the analog counter to an initial value. In another embodiment, the method further comprises reading out, at an end of the integration period, a residual voltage across the integration capacitor to the image processor.

According to another embodiment, the method further comprises calculating, with the image processor, a total charge accumulated by the digital unit cell based on the count voltage and the residual voltage. In one embodiment, calculating a total charge accumulated by the digital unit cell includes calculating, based at least on the count voltage, a total number of times that the accumulated charge on the integration capacitor was discharged, and calculating the total charge accumulated by the digital unit cell by multiplying the total number of times that the accumulated charge on the integration capacitor was discharged by the fixed portion of charge and adding the residual voltage.

Another aspect is directed to an image sensor comprising an image processing circuit, an array of unit cells coupled to the image processing circuit, each unit cell comprising a photodiode coupled to an integration capacitor, the integration capacitor configured to accumulate charge generated by an input light signal incident on the photodiode over an integration period, a comparator coupled to the integration capacitor and configured to compare a voltage across the integration capacitor with a threshold voltage and generate a control signal at a first level each time a determination is made that the voltage across the integration capacitor is greater than the threshold voltage, a charge subtraction circuit coupled to the integration capacitor and the comparator and configured to discharge the accumulated charge on the integration capacitor each time the control signal at the first level is received from the comparator, means for maintaining a count voltage of an analog counter, the count voltage corresponding to a number of times the accumulated charge on the integration capacitor has been discharged, and a readout circuit coupled to the analog counter and configured to provide the count voltage to the image processing circuit at an end of the integration period.

According to one embodiment, each unit cell further comprises means for reading out a residual voltage across the integration capacitor at the end of the integration period. In another embodiment, the image processing circuit is configured to calculate a total charge accumulated by each unit cell based on the count voltage and the residual voltage received from each unit cell.

DETAILED DESCRIPTION OF THE INVENTION

As discussed above, an image sensor of an image capture device may include an array of analog or digital unit cells that is configured to receive light from a desired scene. The received light causes each unit cell in the array to accumulate an electric charge proportional to the light intensity at its location and image processing circuitry coupled to each unit cell converts the accumulated charges into image information corresponding to the desired scene.

Digital unit cells integrate charge similar to analog unit cells; however, when an integrated charge of a digital unit cell exceeds a maximum level, additional circuitry inside the digital unit cell removes the integrated charge while incrementing a separate counter value. After the integration charge is removed (and the counter incremented), the integration of charge in the digital unit cell begins again. Digital unit cells therefore require a counting element that is configured to be incremented each time the integration node is reset (i.e., each time the charge is removed from the unit cell).

A digital counter element is commonly utilized within a digital unit cell to count the number of times the charge stored on the unit cell has been reset; however, such digital counters are typically large and complex. Accordingly, aspects and embodiments are directed to a digital unit cell that includes an analog counter element that is physically smaller, operates with less power, and injects less cross-talk, compared to traditional digital counter elements. The analog counter element described herein allows for a maximum counter value of around 100, utilizing only a handful of transistors. Traditional digital counter elements include at least twenty-six transistors per bit (e.g., 182 transistors for an equivalent maximum counter value of 128).

It is to be appreciated that embodiments of the methods and apparatuses discussed herein are not limited in application to the details of construction and the arrangement of components set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

FIG. 1 is a block diagram illustrating an image capture device 10 that may be used to capture images according to aspects described herein. For example device 10 may be a digital camera, video camera, or other photographic and/or image capturing equipment. Image capture device 10 comprises image sensor 120 and image processing unit 106. Image sensor 120 may be an Active Pixel Sensor (APS) or other suitable light sensing device that can capture images. Image processing unit 106 may be a combination of hardware, software, and/or firmware that is operable to receive signal information from image sensor 120 and convert the signal information into a digital image.

Image sensor 120 includes an array 170 of unit cells 160. Each unit cell 160 accumulates charge proportional to the light intensity at that location in the field of view and provides an indication of the intensity of light at that location to the image processing unit 106. Each unit cell 160 may correspond to a pixel in the captured electronic image.

A particular method for image capture using image capture device 10 may be ripple capture. Ripple capture is a method that captures each row of unit cells from image sensor 120 in order. For example, ripple capture may expose the top row of unit cells of image sensor 120 to light, followed by the second row, followed by the third row, and so forth until the last row of unit cells of image sensor 120 is exposed to light. Another particular method for image processing unit 106 to receive pixel information captured by image sensor 120 may be ripple read. Ripple read is a method that processes each row of unit cells from image sensor 120 in order. Similar to ripple capture, ripple read may process the top row of unit cells of image sensor 120, followed by the second row, followed by the third row, and so forth until the last row of unit cells of image sensor 120 is processed. A ripple reset operation to reset the rows of unit cells of image sensor 120 may be performed similarly.

These methods may be performed on consecutive rows. For example, a ripple capture operation may begin with the first row of image sensor 120. As the ripple capture operation moves to the second row, a ripple read operation may begin on the first row of image sensor 120. After the ripple capture operation moves to the third row, the ripple read operation may begin on the second row and a ripple reset operation may begin on the first row. This may continue until the last row is processed. Once the last row is processed, the image may be processed, stored, and/or transmitted by the image processing unit 106.

Figure 2:
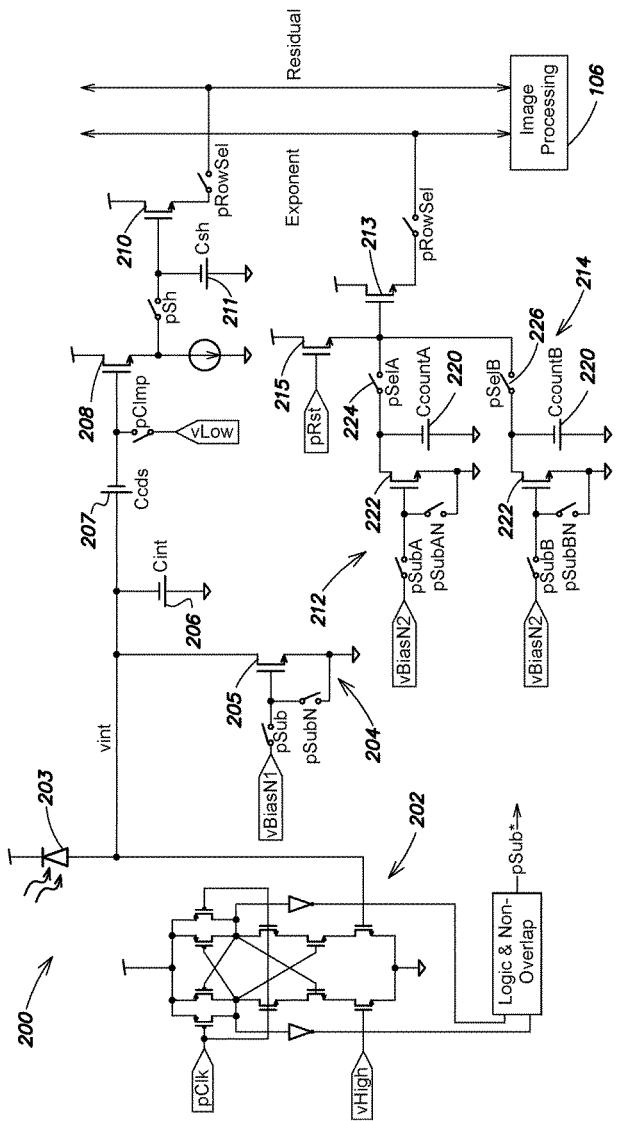
FIG. 2 is a block diagram illustrating a digital unit cell according to aspects of the invention.

FIG. 2 is a block diagram illustrating a digital unit cell 200 according to aspects described herein. The digital unit cell 200 is included in at least one of the unit cells 160 and includes a dynamic comparator 202, a photodiode 203, a charge subtraction circuit 204, an integration capacitor 206, a CDS capacitor 207, a buffer 208, a residual readout circuit 210, an analog counter 212, and a sample and hold capacitor 211. The analog counter 212 includes a first switch (pSubA), a second switch (pSubAN), a count capacitor 220, a transistor 222, a counter readout circuit 213, and a reset circuit 215. The charge subtraction circuit includes a first switch (pSub), a second switch (pSubN), and a transistor 205.

The dynamic comparator 202, photodiode 203, and the charge subtraction circuit 204 are coupled to the integration capacitor 206. The CDS capacitor 207 is coupled between the integration capacitor 206 and the buffer 208. The residual readout circuit 210 is coupled to the buffer 208 and is also configured to be coupled to the image processing unit 106. The sample and hold capacitor is coupled to the residual readout circuit 210. The first switch (pSub) of the charge subtraction circuit 204 is coupled between a bias voltage (vBiasN1) and a gate of the transistor 205. The second switch (pSubN) of the charge subtraction circuit 204 is coupled between the gate of the transistor and ground.

The analog counter 212 and the charge subtraction circuit 204 are in communication with the dynamic comparator 202. The first switch (pSubA) of the analog counter 212 is selectively coupled between a bias voltage (VBiasN2) and a gate of the transistor 222. The second switch (pSubAN) is selectively coupled between the gate of the transistor 222 and ground. The source of the transistor 222 is coupled to ground and the drain of the transistor 222 is coupled to the count capacitor 220. The count capacitor 220 is also coupled to the reset circuit 215 and the counter readout circuit 213. The counter read circuit 213 is configured to be coupled to the image processing unit 106.

Figure 3:
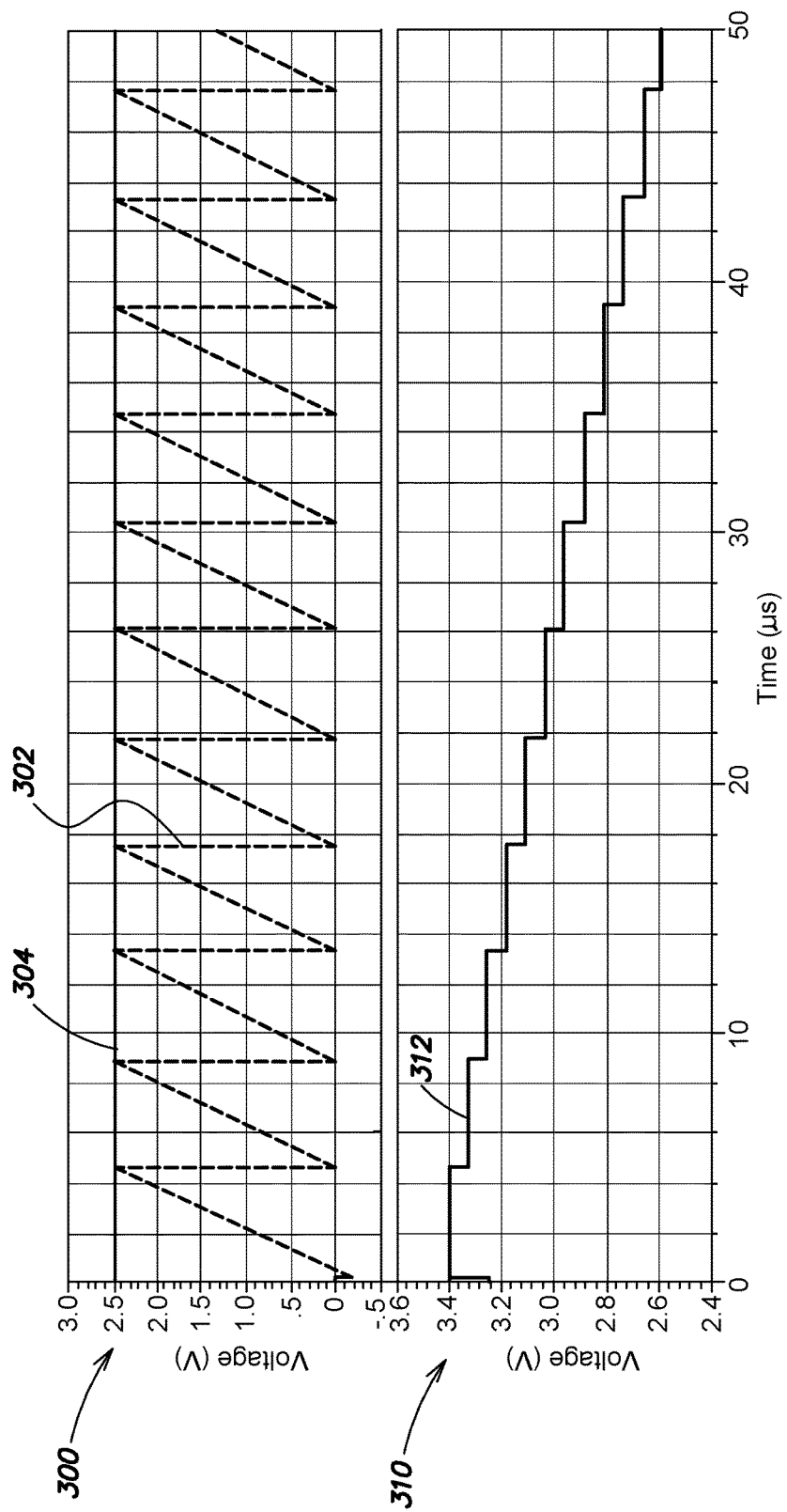
FIG. 3 includes graphs illustrating operation of a digital unit cell circuit according to aspects of the invention.

Operation of the digital unit cell 200 is described below with respect to FIG. 3. FIG. 3 includes graphs illustrating different voltages in the digital unit cell 200 during operation of the digital unit cell according to at least one embodiment. FIG. 3 includes a first graph 300 including a first trace 302 representing the voltage across the integration capacitor over time and a second trace 304 representing a threshold voltage (vHigh). FIG. 3 also includes a second graph 310 including a trace 312 representing count voltage across the count capacitor 220 over time.

At the start of an integration period (i.e., time=0), the voltage 302 across the integration capacitor 206 is zero volts and the reset circuit 215 sets the count voltage 312 across the count capacitor 220 to a desired initial count voltage. For example, at the start of an integration period, a reset signal (pRst) is provided (e.g., by the image processing unit 106 or another controller) to the reset circuit 215. Upon receiving the reset signal (pRst), the reset circuit 215 couples the count capacitor 220 to a desired initial count voltage. In one embodiment, the initial count voltage is 3.4V; however, in other embodiments, the initial count voltage is configured differently. The initial count voltage of 3.4V across the count capacitor 220 is understood (e.g. by the image processing unit 106) to represent a count value of zero.

As optical radiation (e.g., an input light signal) from a scene is incident on the photodiode 203, a resulting photocurrent from the photodiode 203 is provided to the integration capacitor 206 and charge corresponding to the flux of the optical radiation incident on the photodiode 203 accumulates on the integration capacitor 206. As charge accumulates on the integration capacitor 206, the voltage 302 across the integration capacitor 206 increases at a rate equal to the level of the photocurrent divided by the capacitance (Cint) of the integration capacitor 206 (i.e., the slope of the trace 302 depends on the intensity of the flux of the optical radiation incident on the photodiode 203). The voltage 302 across the integration capacitor is monitored by the dynamic comparator 202. More specifically, the voltage 302 across the integration capacitor is compared, by the dynamic comparator 202, to the threshold voltage (vHigh) 304.

In response to a determination that the voltage 302 across the integration capacitor 206 is less than the threshold voltage (vHigh) 304, the dynamic comparator outputs a low pSub* control signal. The low pSub* control signal is provided to the first switch (pSub) and the second switch (pSubN) of the charge subtraction circuit 204 and to the first switch (pSubA) and the second switch (pSubAN) of the analog counter 212. The low pSub* control signal operates the first switch (pSub) of the charge subtraction circuit 204 to remain open and the second switch (pSubN) of the charge subtraction circuit 204 to remain closed. As such, the gate of the transistor 505 is coupled to ground and the charge subtraction circuit 204 does not impact the voltage across the integration capacitor 206 (i.e., the voltage 302 continues to increase as optical radiation is incident on the photodiode 203). The low pSub* control signal operates the first switch (pSubA) of the analog counter 212 to remain open and the second switch (pSubAN) of the analog counter 212 to remain closed. As such, the gate of the transistor 222 is coupled to ground and the count voltage 312 across the count capacitor 220 is unchanged.

In response to a determination that the voltage 302 across the integration capacitor 206 is greater than the threshold voltage (vHigh) 304, the dynamic comparator 202 outputs a high pSub* control signal. The high pSub* control signal is provided to the first switch (pSub) and the second switch (pSubN) of the charge subtraction circuit 204 and to the first switch (pSubA) and the second switch (pSubAN) of the analog counter 212. The high pSub* control signal operates the first switch (pSub) of the charge subtraction circuit 204 to close and the second switch (pSubN) of the charge subtraction circuit 204 to open, thereby providing the bias signal vBiasN1 to the gate of the transistor 205. The bias signal vBiasN1 at the gate of the transistor 205 operates the transistor 205 to couple the integration capacitor 206 to ground and the integration capacitor 206 is discharged to ground (i.e., the voltage 302 across the integration capacitor 206 goes to zero). In one embodiment, the bias signal vBiasN1 is provided to the gate of the transistor 205 by the image processing unit 106; however, in other embodiments, the bias signal vBiasN1 is provided to the gate of the transistor 205 by another controller in communication with the digital unit cell 200.

The high pSub* control signal also operates the first switch (pSubA) of the analog counter 212 to close and the second switch (pSubAN) of the analog counter 212 to open, thereby providing the bias signal vBiasN2 to the gate of the transistor 222. In one embodiment, the bias signal vBiasN2 is provided to the gate of the transistor 222 by the image processing unit 106; however, in other embodiments, the bias signal vBiasN2 is provided to the gate of the transistor 222 by another controller in communication with the digital unit cell 200.

The bias signal vBiasN2 provided to the gate of the transistor 222 is configured such that is operates the transistor 222 to remove a fixed amount of charge from the count capacitor 220. According to at least one embodiment, the fixed amount of charge removed from the count capacitor 220 is defined by the pulse width and the current magnitude of the bias signal vBiasN2. As the fixed amount of charge is removed from the count capacitor 220, the count voltage 312 across the count capacitor 220 is also reduced by a fixed amount. According to one embodiment, the count voltage 312 across the count capacitor is reduced by around 0.075V; however, in other embodiments, the amount by which voltage 312 across the count capacitor is reduced (i.e., and the corresponding fixed amount of removed charge) may be set to some other appropriate value.

Once the voltage 302 across the integration capacitor 206 drops to zero, the dynamic comparator 202 again outputs a low pSub* control signal that operates the first switch (pSub) of the charge subtraction circuit 204 to open, the second switch (pSubN) of the charge subtraction circuit 204 to close, the first switch (pSubA) of the analog counter 212 to open and the second switch (pSubAN) of the analog counter 212 to close. Once the second switch (pSubN) of the charge subtraction circuit 204 is closed, the integration capacitor 206 again accumulates charge from the photocurrent generated by the photodiode 203 in response to radiation incident on the photodiode 203 (i.e., the voltage 302 across the integration capacitor 206 increases).

In response to a determination that the voltage 302 across the integration capacitor 206 is again greater than the threshold voltage (vHigh) 304, the dynamic comparator 202 outputs the high pSub* control signal. The high pSub* control signal operates the first switch (pSub) of the charge subtraction circuit 204 to close and the second switch (pSubN) of the charge subtraction circuit 204 to open, thereby providing the bias signal vBiasN1 to the gate of the transistor 205. The bias signal vBiasN1 at the gate of the transistor 205 operates the transistor 205 to couple the integration capacitor 206 to ground and the integration capacitor 206 is discharged to ground (i.e., the voltage 302 across the integration capacitor 206 again goes to zero).

The high pSub* control signal also operates the first switch (pSubA) of the analog counter 212 to close and the second switch (pSubAN) of the analog counter 212 to open, thereby providing the bias signal vBiasN2 to the gate of the transistor 222. The bias signal vBiasN2 provided to the gate of the transistor 222 is configured such that is operates the transistor 222 to again remove the fixed amount of charge from the count capacitor 220 and reduce the count voltage 312 across the count capacitor 220 by the fixed amount. Once the voltage 302 across the integration capacitor 206 drops to zero, the dynamic comparator 202 again outputs a low pSub* control signal that operates the circuit 200 such that charge is again accumulated on the integration capacitor 206.

The process described above of accumulating charge on the integration capacitor 206, discharging the integration capacitor 206 when the voltage 302 across the integration capacitor 206 exceeds the threshold voltage (vHigh) 304, and reducing the count voltage 312 across the count capacitor 220 each time the charge on the integration capacitor 206 is reset, continuously repeats until the end of the integration period. At the end of the integration period (e.g., at time=50 mS as shown in FIG. 3), the residual voltage across the integration capacitor is provided to the sample and hold capacitor 211. The image processing unit 106 operates the residual readout circuit 210 to provide the residual voltage stored on the sample and hold capacitor 211 to the image processing unit 106. The image processing unit 106 also operates the count readout circuit 213 to provide the current voltage 312 on the count capacitor 220 to the image processing unit 106.

Upon reading out the residual voltage and the analog counter voltage level in parallel, the image processing unit 106 analyzes the voltages to determine the total amount of charge accumulated during the entire integration period. For example, by knowing the initial value at which the count capacitor 220 is set (e.g., 3.4V), the voltage across the count capacitor 220 at the end of the integration period (e.g., 2.6V as shown in FIG. 3), and the voltage change of the count capacitor 220 at each reset event (e.g., 0.075V), the image processing unit 106 can identify the number of times that the charge subtraction circuit 204 has reset the charge on the integration capacitor 206. The image processing unit 106 can calculate the total charge accumulated during the integration period by multiplying the number of times that the integration capacitor 206 was reset by the fixed amount of charge removed from the integration capacitor 206 at each reset event (vHigh*Cint=q) and adding the residual voltage across the integration capacitor 206. By calculating the total charge accumulated by each unit cell 160 of the image sensor 120, the image processing unit 106 can generate a digital image based on the radiation incident on each unit cell 160.

As described above, the digital unit cell 200 includes a single analog counter 212; however, in other embodiments, the digital unit cell 200 may include a second analog counter 214. The second analog counter 214 is configured substantially the same as, and operates substantially the same as, the first analog counter 212. In an embodiment where the digital unit cell 200 includes multiple analog counters, the count capacitor 220 of the first analog counter 212 is selectively coupled to the counter readout circuit 213 via a counter selection switch 224 and the count capacitor 220 of the second analog counter 212 is selectively coupled to the counter readout circuit 213 via a counter selection switch 226. The image processing unit 106 (or another controller in communication with the digital unit cell 200) operates each counter selection switch 224, 226 to alternate which analog counter 212, 214 is providing a count voltage to the counter readout circuitry 213.

For example, in one embodiment during a first integration period, the integration capacitor 206 accumulates charge and the analog counter 212 counts reset events as described above (i.e. by decreasing a count voltage by a fixed amount each time the integration capacitor 206 is reset). At the end of the first integration period, the image processing unit 106 or controller in communication with the digital unit cell 200 operates the counter selection switch 224 to close and the counter selection switch 226 to open, thereby providing the count voltage on the count capacitor 220 of the analog counter 212 to the counter readout circuity 213.

During a second integration period and while the readout circuitry 213 is reading out the count voltage from the count capacitor 220 of the analog counter 212, the integration capacitor 206 continues to accumulate charge and the analog counter 214 counts reset events as described above (i.e. by decreasing a count voltage by a fixed amount each time the integration capacitor 206 is reset). At the end of the second integration period, the image processing unit 106 or controller in communication with the digital unit cell 200 operates the counter selection switch 226 to close and the counter selection switch 224 to open, thereby providing the count voltage on the count capacitor 220 of the analog counter 214 to the counter readout circuity 213. By continuously alternating, over multiple integration periods, which analog counter 212, 214 is counting reset events and which is being read-out by the counter readout circuity 213, the integration of radiation incident on the photodetector 203 can be performed continuously (i.e., without requiring a down period to read out information from the digital unit cell). According to other embodiments, the digital unit cell 200 may include any number of analog counters.

As described above, the count voltage of an analog counter is decreased each time the integration capacitor is reset. However, in other embodiments, the count voltage of an analog counter may be increased each time the integration capacitor is reset.

As also described above, the integration capacitor 206 is coupled to the buffer 208 via the CDS capacitor 207; however, in other embodiments, the CDS capacitor 207 may be removed and the integration capacitor 206 can be coupled directly to the buffer 208 or to the sample and hold capacitor 211 via a sample and hold switch (pSH).

As described above, a digital unit cell is provided that includes an analog counter element. The analog counter element is set with an initial counter voltage and the counter voltage is decreased each time the integration capacitor of the digital unit cell is reset. The total charge accumulated in the digital unit cell can be calculated based on the number of times the count voltage of the analog counter is decreased and any residual voltage stored on the integration capacitor. The analog counter is physically smaller, operates with less power, and injects less cross-talk, compared to traditional digital counter elements. The analog counter is also capable of maintaining a maximum counter value that is equivalent to traditional digital counters, despite its smaller size.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A digital unit cell comprising:
   a photodiode;
   an integration capacitor coupled to the photodiode and configured to accumulate charge generated by the photodiode responsive to an input light signal incident on the photodiode over an integration period;
   a comparator coupled to the integration capacitor and configured to compare a voltage across the integration capacitor with a threshold voltage and to generate a control signal at a first level each time a determination is made that the voltage across the integration capacitor is greater than the threshold voltage;
   a charge subtraction circuit coupled to the integration capacitor and to the comparator and configured to receive the control signal at the first level from the comparator and to discharge the accumulated charge on the integration capacitor each time the control signal at the first level is received from the comparator;
   at least one analog counter coupled to the comparator and configured to receive the control signal at the first level from the comparator and to decrease a count voltage by a fixed amount each time the control signal at the first level is received from the comparator; and a counter readout circuit coupled to the at least one analog counter and configured to provide the count voltage to an image processing circuit at an end of the integration period.

2. The digital unit cell of claim 1, wherein the at least one analog counter comprises a count capacitor coupled to the counter readout circuit and configured to maintain the count voltage.

3. The digital unit cell of claim 2, wherein the at least one analog counter further comprises a transistor circuit coupled to the count capacitor and configured to remove a fixed portion of charge from the count capacitor each time the at least one analog counter receives the control signal at the first level from the comparator.

4. The digital unit cell of claim 3, wherein the at least analog counter further comprises a reset circuit coupled to the count capacitor and configured to set the count voltage to an initial value at a beginning of the integration period.

5. The digital unit cell of claim 3, further comprising a sample and hold capacitor coupled to the integration capacitor and configured to receive a residual voltage from the integration capacitor at the end of the integration period.

6. The digital unit cell of claim 5, further comprising a residual readout circuit coupled to the sample and hold capacitor and configured to output the residual voltage from the sample and hold capacitor at the end of the integration period.

7. The digital unit cell of claim 6, further comprising an image processing circuit coupled to the counter readout circuit and the residual readout circuit and configured to receive the count voltage from the counter readout circuit, receive the residual voltage from the residual readout circuit, and calculate a total charge accumulated by the digital unit cell based on the count voltage and the residual voltage.

8. The digital unit cell of claim 7, wherein the image processing circuit is further configured to calculate the total charge accumulated by the digital unit cell by:
  calculating, based at least on the count voltage, a total number of times that the charge subtraction circuit discharged the accumulated charge on the integration capacitor; and
  calculating the total charge accumulated by the digital unit cell by multiplying the total number of times that the charge subtraction circuit discharged the accumulated charge on the integration capacitor by the fixed portion of charge and adding the residual voltage.

9. The digital unit cell of claim 1, wherein the charge subtraction circuit comprises a transistor circuit configured to remove the accumulated charge on the integration capacitor each time the charge subtraction circuit receives the control signal at the first level from the comparator.

10. The digital unit cell of claim 1, wherein the at least one analog counter includes a first analog counter selectively coupled to the counter readout circuit via a first counter selection switch and a second analog counter selectively coupled to the counter readout circuit via a second counter selection switch.

11. A method for operating a digital unit cell comprising a photodiode and an integration capacitor, the method comprising:
  generating charge in response to an input light signal incident on the photodiode over an integration period;
  accumulating the charge on the integration capacitor;
  comparing a voltage across the integration capacitor with a threshold voltage;
  removing the accumulated charge on the integration capacitor each time the voltage across the integration capacitor exceeds the threshold voltage;
  decreasing, by a fixed amount, a count voltage of an analog counter each time the voltage across the integration capacitor exceeds the threshold voltage; and
  reading out, at an end of the integration period, the count voltage of the analog counter to an image processor.

12. The method of claim 11, wherein removing the accumulated charge on the integration capacitor includes coupling the integration capacitor to ground.

13. The method of claim 11, wherein decreasing, by the fixed amount, the count voltage of the analog counter includes removing a fixed portion of charge from a count capacitor in the analog counter.

14. The method of claim 13, further comprising setting, at a beginning of the integration period, the count voltage of the analog counter to an initial value.

15. The method of claim 13, further comprising reading out, at an end of the integration period, a residual voltage across the integration capacitor to the image processor.

16. The method of claim 15, further comprising calculating, with the image processor, a total charge accumulated by the digital unit cell based on the count voltage and the residual voltage.

17. The method of claim 16, wherein calculating a total charge accumulated by the digital unit cell includes:
  calculating, based at least on the count voltage, a total number of times that the accumulated charge on the integration capacitor was discharged; and
  calculating the total charge accumulated by the digital unit cell by multiplying the total number of times that the accumulated charge on the integration capacitor was discharged by the fixed portion of charge and adding the residual voltage.

18. An image sensor comprising:
an image processing circuit;
an array of unit cells coupled to the image processing circuit, each unit cell comprising:
  a photodiode coupled to an integration capacitor, the integration capacitor configured to accumulate charge generated by an input light signal incident on the photodiode over an integration period;
  a comparator coupled to the integration capacitor and configured to compare a voltage across the integration capacitor with a threshold voltage and generate a control signal at a first level each time a determination is made that the voltage across the integration capacitor is greater than the threshold voltage;
  a charge subtraction circuit coupled to the integration capacitor and the comparator and configured to discharge the accumulated charge on the integration capacitor each time the control signal at the first level is received from the comparator;
  means for maintaining a count voltage of an analog counter, the count voltage corresponding to a number of times the accumulated charge on the integration capacitor has been discharged; and
  a readout circuit coupled to the analog counter and configured to provide the count voltage to the image processing circuit at an end of the integration period.

19. The image sensor of claim 18, wherein each unit cell further comprises means for reading out a residual voltage across the integration capacitor at the end of the integration period.

20. The image sensor of claim 19, wherein the image processing circuit is configured to calculate a total charge accumulated by each unit cell based on the count voltage and the residual voltage received from each unit cell.

* * * * *